Sept. 20, 1960 R. A. LAUTIER ET AL 2,953,315
INERTIA REEL
Filed Feb. 1, 1957 2 Sheets-Sheet 1

INVENTORS.
Roger A. Lautier
James F. Spielman
BY
James G. Blethell
ATTORNEY

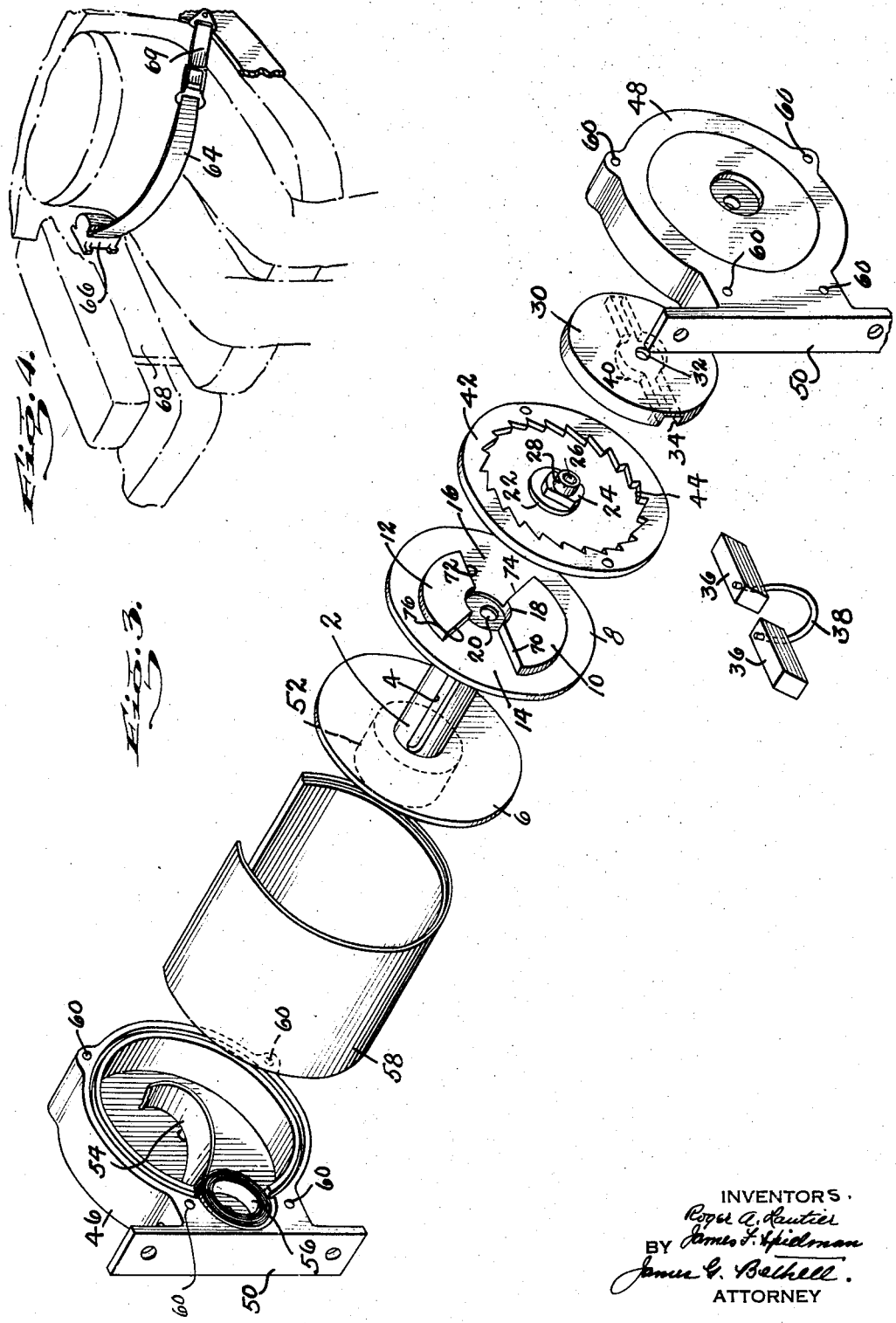

United States Patent Office 2,953,315
Patented Sept. 20, 1960

2,953,315

INERTIA REEL

Roger A. Lautier, Litchfield, and James F. Spielman, Torrington, Conn., assignors to Aerotec Industries, Inc., Bantam, Conn., a corporation of Connecticut Filed Feb. 1, 1957, Ser. No. 637,693

10 Claims. (Cl. 242—107.4)

Our invention relates to an improvement in inertia reels and has for one of its objects to provide a reel wherein unwinding of the reel spool at excessive speeds is prevented, our reel being so constructed that it will automatically lock itself upon attempted acceleration in an unwinding direction.

Because of the many fields in which our reel is usable, it is to be understood that our reference to seat safety belt use in the disclosure which follows is purely for clarity of description and is not to be considered as limiting the use of our reel to the safety belt field.

A further object of our invention is to provide an inertia reel particularly well adapted for safety belts for aircraft and other conveyances which is of such construction as to add to the comfort of a seat occupant and to improve the appearance of the seat itself, as compared with existing safety belts.

Another object of the invention is to provide a construction wherein a seat safety belt is carried by the reel, and the reel is mounted at one side of the seat. To put the safety belt to use, the seat occupant merely draws the belt from the reel across his lap and attaches the free end of the belt to the other side of the seat. When finished, the seat occupant merely disconnects the free end of the belt from the seat, and it will be rewound automatically upon the reel, so as not to be an operational hazard or interfere with the comfort of the seat occupant.

Still another object of our invention is to provide a reel of such construction that in normal use of the safety belt the seat occupant is allowed freedom of body movement considerably in excess of that permitted by prior constructions.

A further object of the invention is to provide a reel construction which automatically locks upon rapid deceleration of the conveyance in which the reel is installed, such as would occur, for example, in the crash of an aircraft or automobile, thereby preventing the user from being thrown forward against the structure of the conveyance.

A still further object of our invention is to provide an inertia reel which is silent in operation despite the fact that the reel comprises a pawl and ratchet.

In the accompanying drawings,

Fig. 3 is an exploded view of our improved reel; and

Fig. 4 is a fragmentary perspective showing our reel in use in connection with a seat safety belt.

Figure 1:
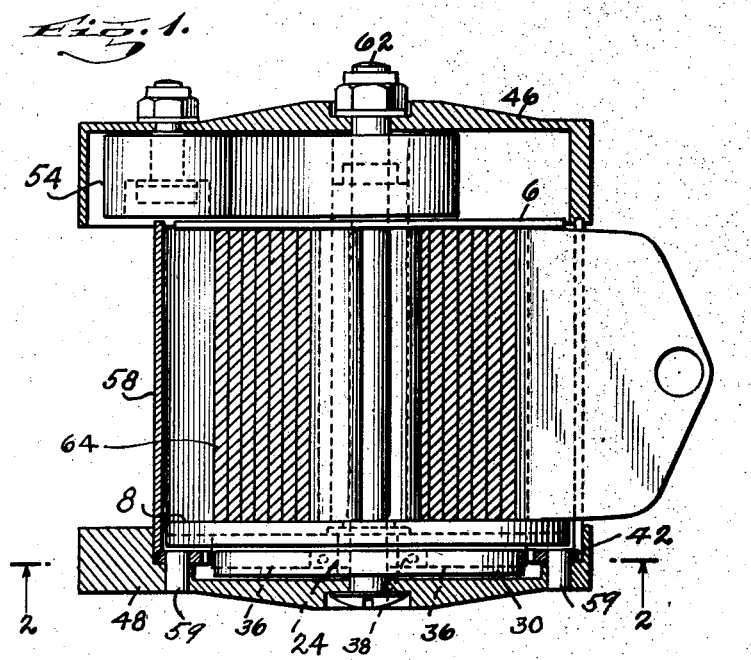
Fig. 1 is a sectional elevational view of an embodiment of our invention.

Referring to the drawings in detail, our improved reel comprises a spool made up of a hollow spindle 2, provided with a longitudinal slot 4 and with end flanges 6 and 8. The flange 8 of the spool, as clearly illustrated in Fig. 3, is provided on its outer face with segmental, raised areas 10 and 12, spaced from each other to provide between them diametrically opposed triangular spaces 14 and 16.

18 designates a counterbore in the raised areas of the flange 8 of the spool, this counterbore being eccentric to the bore 20 of the flange, the flange bore, as will be understood, being in concentric alignment with the axis of the spool spindle 2. The counterbore 18 receives an eccentric hub 22 of a cam 24, and, with the spool and cam assembled, the bore 26 of the cam is in concentric alignment with the bore 20 of the spool flange 8. In addition to the eccentric hub 22, the cam 24 is provided with a hub 28, which is concentric with the cam bore 26.

30 designates an inertia lock plate, provided with a central bore 32 for rotatably mounting the plate on the cam hub 28. The lock plate 30 is provided with a medial groove 34 (Fig. 3), extending entirely across the inner face thereof. This groove is provided for the reception of a pair of opposed locking pawls 36, which are spring-loaded inwardly by a U-spring 38, contained in a central counterbore 40 in the grooved face of the lock plate 30. It will be apparent from an inspection of Figs. 1 and 3 that the pawls 36 have a thickness greater than the depth of the groove 34 in the lock plate, so as partially to be contained in the spaces 14 and 16 between the raised areas of the spool flange 8.

It will be apparent from the description thus far given that means are provided for connecting the inertia plate 30 and the reel spool together for simultaneous rotation under normal conditions. It will be equally apparent that, if the reel spool is suddenly accelerated in a counterclockwise direction (Fig. 2), the reel spool and the cam 24 will be rotated slightly, without imparting rotation to the inertia lock plate 30 because of the static inertia of this plate. The net result of such operation is that the cam 24 will force the pawls 36 outwardly in opposition to their spring 38 (phantom lines, Fig. 2).

Surrounding the lock plate 30 and, hence, in the path of the pawls 36 is a stationary lock ring 42. This ring is provided internally with ratchet teeth 44, which are adapted to be engaged by the pawls 36 on the outward movement of these pawls.

46 and 48 designate the two end plates of our reel, these plates being provided with bases 50 for reel-mounting purposes.

The outer face of the spool flange 6 is provided with a concentric boss 52, which extends into the cap or end plate 46. One end of a negative spring 54 (see Fig. 3) is attached to this boss, the other end of the spring being coiled about a rotatable drum 56 or other suitable rotatable element provided for that purpose within the cap 46.

58 designates the reel housing, which only partially surrounds the reel spool so as to permit the reeling and unreeling of the material wound upon the spool.

The lock ring 42 above referred to is contained within the reel cap 48 and is locked against rotation therein by pins 59 or by other suitable means.

The parts are held in the assembled position shown in Fig. 1 by suitable tie bolts extending through bolt holes 60, provided for that purpose in the end plates or caps 46 and 48.

62 designates a bolt passing through the center of the reel from one end to the other and functioning as an axle for the reel spool, the cam 24, and lock plate 30.

64 designates a safety belt shown wound or coiled upon the reel spool (see Fig. 1). The inner end of this belt is threaded through the longitudinal slot 4 of the spool spindle 2 and may be provided with a loop through which the axle bolt 62 extends. This mode of attachment of the belt end to the reel spool is merely illustrative and not definitive.

It will be seen form all of the foregoing that our improved reel is very simple in its construction and comprises few parts, which are readily assembled with the minimum of skill and effort.

When used for seat safety belt purposes, the reel assembly, which has been designated 66 in Fig. 4, is mounted in convenient location on the seat frame 68. When using the belt, the seat occupant merely draws it from the reel, passes it across his lap, and attaches its free end to means at the opposite side of the seat, illustrated here to be a short length of belt 69 containing a buckle for fastening convenience.

Figure 2:
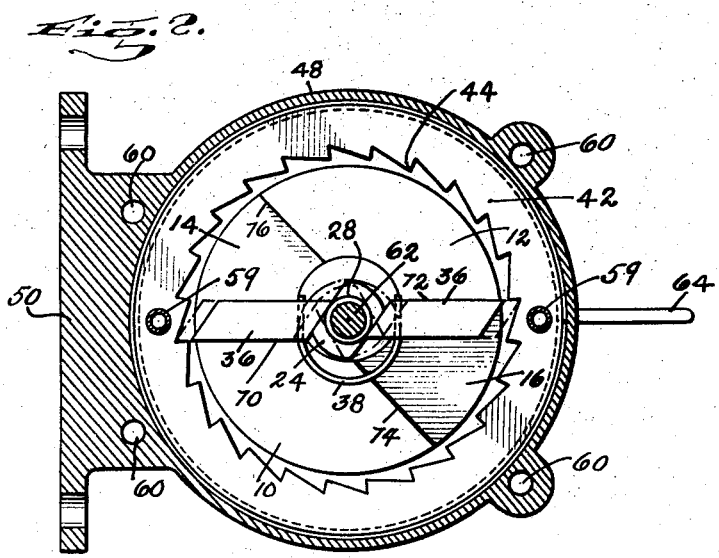
Fig. 2 is a section taken substantially on the line 2—2 of Fig. 1.

The function of the negative spring 54 is to rotate the reel spool in a rewind direction, viz., clockwise, as viewed in Fig. 2; consequently, when the seat occupant unhooks the free end of the safety belt, it will be rewound automatically upon the reel so as to be out of the way and not interfere with the comfort of the seat occupant. It will be appreciated also that, with the belt in use, the seat occupant has the desired freedom of movement, so that his bodily comfort is not impaired.

Assuming the safety belt 64 is in use: Under normal conditions the edge or side 70 of the raised area 10 of the reel spool flange 8 will be abutting one side of one of the locking pawls 36, while the edge or side 72 of the raised area 12 of the spool flange 8 will be abutting the opposite side of the other locking pawl 36 (see Fig. 3). The raised areas 10 and 12 and pawls 36 are in these same relative positions when the belt is not in use and is fully rewound upon the reel. When drawing the belt slowly from the reel, the reel spool, cam 24, pawls 36, and lock plate 30, all rotate as a unit. Under these conditions there is no rotation of the cam 24 relative to the inner ends of the pawls 36 and, hence, no outward movement of the pawls, and the reel spool remains free to turn in a pay-out direction. If, however, the reel spool should be suddenly accelerated in an unwinding direction (counterclockwise, Fig. 2), as would occur, for example, if the conveyance in which the reel is installed is abruptly decelerated, the reel spool and cam 24 would be rotated relatively to the pawls 36, the lock plate 30 remaining stationary due to its static inertia, so that the pawls 36 are moved outwardly into engagement with the teeth 44 of the lock ring 42. The extent of the rotative movement of the cam 24 is obviously controlled by the width of the spaces 14 and 16 between the raised areas 10 and 12 on the spool flange 8, and these spaces are such that, when the reel spool and the cam 24 have rotated far enough relatively to the locking pawls 36 to bring the edge 74 of the raised area 10 into engagement with one pawl 36 and the edge 76 of the other raised area 12 into engagement with the other pawl 36, the two pawls will have been moved endwise the full depth of the teeth 44 of the lock ring 42. It will be understood that, as soon as the tension on the belt which caused abrupt acceleration of the reel spool, thereby effecting locking of the reel, is removed, the negative spring 54 will remove the reel spool sufficiently to permit the pawl spring 38 to withdraw the pawls clear of the teeth on the lock ring, so that rotation of the reel spool in a rewinding direction is quiet.

It will be seen from all of the foregoing that we have provided an inertia reel wherein the reel spool is automatically locked against rotation in an unwinding direction in the event of a sudden acceleration of its unwinding speed. It will be appreciated also that, when our reel is used for seat safety belts, our construction will prevent the seat occupant from being thrown forward against the structure of the conveyance in which the reel is installed in case of a sudden deceleration of the vehicle, such as would occur in the event of a crash of the conveyance.

It is to be understood that changes may be made in the details of construction and arrangement of parts within the purview of our invention.

What we claim is:

1. An inertia take-up reel comprising, in combination, a rotatable spool; a rotatable inertia lock plate and a fixed lock ring adjacent one end of said spool, said spool being capable of rotary movement relative to said lock plate; and means intermediate the said spool and lock plate normally effecting their simultaneous rotation, said means moving into engagement with said non-rotatable lock ring upon abrupt acceleration of the reel spool relative to said lock plate, to lock the spool and inertia lock plate against rotation in an unwinding direction.

2. An inertia take-up reel comprising, in combination, a rotatable spool; a rotatable inertia lock plate and a fixed lock ring adjacent one end of said spool; means intermediate the spool and lock plate normally functioning to provide for rotation of said inertia lock plate and said spool simultaneously; and a cam for causing said means positively to engage said stationary lock ring upon sudden acceleration of said spool relative to the inertia lock plate, to lock the spool against rotation.

3. An inertia take-up reel for safety belts, said reel comprising, in combination, a spool upon which a belt is adapted to be wound; a support for the spool upon which the spool is rotated when normally drawing the belt from the reel; a lock plate freely rotatable on said support; a cam carried by said spool and rotatable on said support; a pawl constantly in engagement with said cam, said pawl extending radially of the spool and lock plate and interlocked with the lock plate, whereby, upon normal unwinding of the belt, the spool, cam, pawl, and lock plate will rotate as a unit; and a lock ring surrounding the lock plate adapted to be engaged by the pawl to prevent rotation of said spool when said pawl is moved outwardly upon rotation of said cam relative to the pawl due to sudden acceleration of the spool and the static inertia of the lock plate.

4. An inertia take-up reel for safety belts, said reel comprising, in combination, a spool upon which a belt is adapted to be wound; a support for the spool upon which the spool is rotated when normally drawing the belt from the reel; a lock plate freely rotatable on said support; a cam affixed to said spool and rotatable on said support; a pawl in constant engagement with said cam, said pawl extending radially of and interlocked with said lock plate, to effect rotation of the spool, cam, pawl, and lock plate as a unit during normal unwinding of the belt, said pawl moving outwardly under the action of said cam when the cam is rotated relatively to the pawl and lock plate due to sudden acceleration of the spool and the static inertia of the lock plate; and a fixed lock ring surrounding the lock plate and provided on its inner periphery with teeth adapted to be engaged by the pawl on its said outward movement, positively to prevent rotation of the spool in an unwinding direction.

5. An inertia take-up reel for safety belts, said reel comprising, in combination, a spool upon which a belt is adapted to be wound; a spring cap at one end of the spool into which the spindle of the spool extends; a boss within said cap; a negative spring within said cap, one end of which is attached to the spool spindle, its other end being coiled about said boss; a cam fastened to the end of the spool opposite said cap; a lock plate rotatably mounted on an extension of said cam, said lock plate being provided on its inner face with a radially extending groove; a radially extending, spring-loaded pawl slidably mounted in said groove and having its inner end in constant contact with said cam; a lock cap at the end of the reel opposite the said spring cap; and a non-rotatable lock ring affixed to said lock cap and surrounding said lock plate; said cam and pawl providing a driving connection between the reel spool and lock plate whereby the spool, cam, and lock plate will rotate as a unit in normal pay-out of the belt, sudden acceleration of the belt pay-out effecting rotation of said cam relative to said pawl due to the static inertia of said lock plate, to force the pawl outwardly into engagement with the said lock ring, thereby to lock the spool to the non-rotatable lock ring.

6. An inertia take-up reel for safety belts, said reel comprising, in combination, a spool upon which a belt is adapted to be wound; a cam affixed to one end of the spool; an inertia lock plate rotatable relatively to said spool at the cam end of the spool, the adjacent faces of the cam end of said spool and the lock plate being grooved radially, one of said grooves being wider than the other; a pawl having a sliding fit in the groove of the lock plate and extending into the groove of the spool, the said pawl loosely fitting the groove in the spool to provide for some rotary movement of the spool relative to the lock plate; means for maintaining the inner end of said pawl in constant engagement with said cam, said spool, cam, and lock plate rotating as a unit on normal pay-out of the belt; and a fixed lock ring encircling said lock plate, sudden acceleration of the belt pay-out rotating the spool and cam relatively to the lock plate because of the inertia of the lock plate, thereby to cam the said pawl outwardly into locking engagement with said fixed lock ring to lock the reel spool to the ring.

7. An inertia take-up reel comprising, in combination, a rotatable spool; a cam affixed to and projecting from one end of said spool, said cam being provided with a hub projecting from the end of the spool, said hub being axially aligned with the spool; an inertia lock plate rotatably mounted on said hub, the face of said lock plate facing the cam end of the spool being grooved radially; a pawl in the lock plate groove slidable radially of the lock plate; a spring for maintaining the inner end of said pawl in engagement with said cam, the depth of the groove in the lock plate being less than that of the pawl, whereby the face of the pawl projects beyond the face of the lock plate; a radially extending groove in the face of the cam end of said spool for receiving the projecting portion of said pawl, said groove being substantially greater in width than the width of the pawl, to permit of some relative rotation between the reel spool and the lock plate; and a fixed lock ring encircling said lock plate, said reel spool, cam, pawl, and inertia lock plate normally rotating as a unit, sudden acceleration of the reel spool effecting rotation of the spool and cam relative to the pawl and inertia lock plate to cam the pawl radially of the lock plate into locking engagement with the fixed lock ring.

8. An inertia take-up reel comprising, in combination, a rotatable spool; a cam affixed to one end of said spool; an inertia lock plate at the cam end of said spool, said spool and plate being capable of relative rotation, the adjacent faces of the cam end of said spool and the lock plate being grooved radially; a pawl in said grooves slidable radially of the spool and plate; a spring for maintaining the inner end of the pawl normally in engagement with the dwell of said cam, said spool, cam, pawl, and inertia lock plate rotating as a unit on normal rotation of the spool in a pay-out direction; and a fixed lock ring encircling said lock plate, said ring being internally notched, sudden acceleration of the said spool in a pay-out direction effecting rotation of said cam relative to said inertia lock plate to rotate the dwell of the cam out of contact with the said pawl and bring the active portion of the cam into engagement with the pawl, thereby to cam the pawl outwardly radially of the inertia lock plate into locking engagement with the notches on the lock ring to lock the spool against further rotation in a pay-out direction.

9. A take-up reel comprising, in combination, a rotatable spool; a rotatable lock plate and a fixed lock ring, said spool being rotatable relatively to said lock plate; means intermediate said spool and lock plate normally functioning to provide for simultaneous rotation of the said lock plate and spool; and means carried by the said spool for moving said first-named means into engagement with the stationary lock ring upon abrupt acceleration of said spool relatively to the lock plate, positively to stop rotation of the spool.

10. A safety reel comprising, in combination, a rotatable spool; a locking pawl mounted in one end of the spool for movement transversely of the spool end, said pawl moving with the spool during rotation of the spool below a predetermined acceleration; a fixed locking ring encircling said spool end; and means operable upon rotation of said spool at said predetermined acceleration for positively moving said pawl outwardly transversely of the spool into locking engagement with said locking ring to lock the spool against continued rotation.

References Cited in the file of this patent

UNITED STATES PATENTS

| | | |
|---|---|---|
| 2,105,469 | Bosch | Jan. 18, 1938 |
| 2,557,313 | Quilter | June 19, 1951 |
| 2,701,693 | Nordmark et al. | Feb. 8, 1955 |
| 2,725,097 | Thoreson | Nov. 29, 1955 |
| 2,843,335 | Hoven et al. | July 15, 1958 |

FOREIGN PATENTS

| | | |
|---|---|---|
| 746,540 | Great Britain | Mar. 14, 1956 |